United States Patent [19]

Petersson et al.

[11] Patent Number: 4,911,744

[45] Date of Patent: Mar. 27, 1990

[54] METHODS AND APPARATUS FOR ENHANCING COMBUSTION AND OPERATIONAL EFFICIENCY IN A GLASS MELTING FURNACE

[75] Inventors: Martin E. Petersson, Seven Hills; Robert L. Strosnider, Cleveland Heights; Howard N. Hubert, Bedford, all of Ohio

[73] Assignee: AGA A.B., Lidingo, Sweden

[21] Appl. No.: 259,467

[22] Filed: Oct. 17, 1988

Related U.S. Application Data

[63] Continuation of Ser. No. 71,633, Jul. 9, 1987, abandoned.

[51] Int. Cl.⁴ .............................................. C03B 5/235
[52] U.S. Cl. ....................................... 65/136; 65/135; 65/337; 65/346
[58] Field of Search ............... 65/27, 126, 135, 136, 65/137, 325, 337, 386, 387

[56] References Cited

U.S. PATENT DOCUMENTS

| Re. 26,364 | 3/1968 | Kurzinski | 65/337 |
|---|---|---|---|
| 1,964,544 | 6/1934 | Trinks | 158/117.5 |
| 3,353,941 | 11/1967 | Hanks et al. | 65/32 |
| 3,592,623 | 7/1971 | Shepherd | 65/135 |
| 3,856,496 | 12/1974 | Nesbitt et al. | 65/29 |
| 3,951,643 | 4/1976 | Schempp et al. | 75/10 |

FOREIGN PATENT DOCUMENTS 0115863 11/1986 European Pat. Off.

*Primary Examiner*—Arthur Kellogg
*Attorney, Agent, or Firm*—Calfee, Halter & Griswold

[57] ABSTRACT

In a glass melting furnace of the type that has a basin wherein a bath of molten glass is heated by a blanket of flame that extends over the molten bath, performance and productivity are enhanced by installing oxygen injection lances through holes that are drilled through walls of the furnace at tuck stone levels just above the top surface of the molten bath of glass in the furnace basin. The lances are thin walled tubes that each carry an adjustable flange for preventing unwanted convection and radiation through furnace wall holes that receive the lances. By bending the thin walled tubes to carefully direct the discharging flows of oxygen so that the discharge paths properly extend across the top surface of the molten bath in closely spaced, parallel relationship thereto, and by selecting discharge opening sizes, the injected flows of oxygen are aimed and defined so as to effectively draw the blanket of flame down to surface portions of the molten material that is being heated, and to achieve complete combustion and maximum flame coverage. Thus both flame positioning and combustion efficiency are improved concurrently.

6 Claims, 1 Drawing Sheet

METHODS AND APPARATUS FOR ENHANCING COMBUSTION AND OPERATIONAL EFFICIENCY IN A GLASS MELTING FURNACE

This is a continuation of application Ser. No. 071,633 filed July 9, 1987, now abandoned.

BACKGROUND OF THE INVENTION

1. Field of the Invention

The present invention relates generally to methods and apparatus for improving the heating performance and productivity of glass melting furnaces and the like. More particularly, the present invention relates to the use of oxygen lances that are installed though holes in furnace walls to inject flows of oxygen in directions that extend substantially parallel to the top surface of a bath of molten glass contained within the furnace. The injected flows extend in closely spaced relationship to the top surface of the molten glass (1) to draw a blanket of flame from a location spaced above the glass downwardly into contact with the glass, and (2) to improve combustion and flame coverage in selected areas of the furnace, to concurrently improve flame positioning and character, whereby improvements also result in heat transfer from the combustion zone to the molten glass, and combustion efficiency within the combustion zone.

2. Prior Art

In a glass melting furnace, a large melting tank typically is defined at least in part by wall structures that are thick and provide only limited access to contents within the melting tank. Constituents used to manufacture glass are introduced into the tank and heated therein to provide a bath of molten glass. As some of the molten glass is withdrawn from the bath for use in manufacturing processes, additional ingredients are added to the bath to replenish the bath and to keep its top surface at a substantially constant level.

Contents of the melting tank or "basin" of the furnace are heated, at least in part, by using an array of nozzles that inject natural gas (or other fuel) downwardly toward and transversely across the top surface of the molten glass to form what can be thought of as a "blanket" of flame that extends over a major portion of the bath of molten glass. To maximize productivity and to minimize fuel waste, it is desirable to obtain relatively uniform flame coverage over the area of the furnace basin, and to feed fuel and oxygen to the combustion zone in such a way that complete combustion of the fuel is achieved.

However, a problem inherent in operating a furnace of this type is that, depending on a wide variety of factors that vary from location to location across the top of the furnace basin, the character of the flame blanket that results a combustion is used to heat molten glass is found to differ in a variety of ways including such characteristics as flame character, flame spread, uniformity of flame coverage, combustion efficiency, heat transfer rate and efficiency, etc. Factors that cause such variations may include the character of the supply of natural gas and/or combustion air to a particular region, whether conduits and/or nozzles are fully operational, partially obstructed, deformed and/or deteriorated in character, etc. But, regardless of the reason or reasons for nonuniformity of flame blanket composition and character, it is desirable from the point of view of heating the glass efficiently that some means be provided to improve flame character and heating performance. While the need for an effective means to provide localized improvement extends throughout the combustion zone, it is especially prevalent in areas over the furnace basin where deficiencies in the character of the flame blanket are found to be quite pronounced.

Another problem has to do with the height at which the blanket of flame tends to reside above the upper surface of the bath of molten glass. The tendency of the flame blanket to reside at a distance spaced above the top surface of the molten glass may result from the interaction of a number of factors including the presence of upwardly moving flows of hot gases that emanate from the bath, the paucity of oxygen in the combustion zone layer that resides immediately adjacent the top surface of the bath, etc. But, regardless of the reason or reasons that may explain why the flame blanket tends to reside at a location spaced above the molten glass, there can be no disputing the desirability of providing a suitable method and means for forcing the flame blanket downwardly to enhance flame positioning and coverage, and to thereby improve the efficiency of the flame blanket in heating the molten glass.

Still another problem is that of enhancing and maintaining good combustion efficiency. While this problem has been addressed by a wide variety of proposals including the proposed use of devices of various types for injecting oxygen at discrete burner locations to treat the flame patterns within combustion zone areas that are served by selected burners, the need remains for a relatively simple and inexpensive system that is adequately flexible to address the complex needs of a combustion zone in a glass melting furnace as by providing localized enhancement of combustion as by the controlled injection of oxygen.

SUMMARY OF THE INVENTION

The present invention overcomes the foregoing and other drawbacks of prior proposals and addresses the needs described above by providing novel and improved methods and apparatus for effectively altering the positioning and character of a flame blanket at selected locations atop the basin of a glass melting furnace, and for simultaneously enriching the oxygen content of combustion gases to improve combustion efficiency.

The present invention overcomes drawbacks encountered in glass melting furnaces in prior use, and does so in a very simple, direct and elegant manner without extensive or expensive modification of the furnace structure. Improvement is brought about by providing simple tube-type lances to inject flows of oxygen through holes that are formed in the furnace walls, with the lances being adjustable to permit operators to control the oxygen flows that are discharged from the lances, and to control their influence on the flame blanket that tends to reside at a distance spaced upwardly from the bath of molten glass in a glass melting furnace.

A feature of the preferred practice of the present invention resides in the introduction of oxygen not necessarily where flames from burners are most predominantly located but rather into a predetermined portion of the combustion zone where flames are most desirably located for optimum heating of the molten glass in the basin of the furnace. The approach thus taken is to draw the blanket of flames downwardly to the one place where it will do the most good, namely the vicinity of the top surface of the molten glass, and, in the same process, to enrich the flames with supplemented flows of oxygen for improved combustion efficiency in this important part of the combustion zone.

In preferred practice, holes are drilled through the furnace walls of a glass melting furnace at the tuck stone level, i.e., at a level that is below the normal level of the flame blanket, but slightly above the level of the top surface of the bath of molten glass. Lances are inserted into the holes to inject flows of oxygen out across the top surface of the molten glass in directions that parallel the top surface, i.e., into a layer of the combustion zone that immediately overlies the molten glass. The lances used to effect oxygen injection are preferably of a thin walled type that enables the lances to be adjusted to provide desired directions and characteristics of flow, which, if done properly, advantageously affects the degree of heating that is provided by the flame that blankets the top surface of the molten glass. Adjustment of the lances is effected (1) by bending the elongate tubes that form the lances to aim the flows of oxygen that discharge from the lances, and (2) by selecting lance diameter and/or lance discharge opening size to provide desired rates of flow for each of the lances.

A further feature of the invention resides in the use of radially extending flange members that are carried on each of the elongate lances near their discharge ends so that, once a lance has been properly positioned and the propriety of its discharge of oxygen has been assured, the flange can be releasably tightened in place on its associated lance to closely cover and effectively close open parts of a hole that has been drilled through the furnace wall to install the lance. Thus, unwanted heat loss by radiation and/or convection is prevented, and the inspiration entry of unwanted gas into the furnace through the holes is minimized.

A feature of the invention resides in the use of lances of thin walled construction. While the use of a thin walled lance naturally enables the lance to be bent more easily than would be the case if the lances were formed from a wall of thicker cross section of the same material, other advantages are also obtained. One such advantage is the fact that minimizing wall thickness of a lance makes it easier to cool the lance so that it does not overheat during use and suffer from heat-induced deterioration. Thus, by using lances of thin walled construction (typically formed from stainless steel), cooling of the lance both by means of internal gas flows of oxygen (or of a purging gas, such as nitrogen that is used to maintain positive pressure in the lance when oxygen flow is shut off during furnace operation), and by means of external flows of ambient cooling air.

In regenerative type furnaces, supplies of lance-injected oxygen are cycled to correspond with the cycling of the burners, whereby when a burner on one side of the furnace is idle, its supply of injected oxygen is cut off. In preferred practice, however, when oxygen flow through a lance is cut off, a low velocity flow of an alternate gas such as nitrogen is maintained through the lance both to cool the lance and to keep unwanted particles and the like from entering the discharge end of the lance.

A significant aspect of features of the oxygen enrichment system of the present invention is that these features ordinarily may be implemented at relatively low installation cost in existing furnace structures, not only to overcome deficiencies in burner performance, but also to enhance combustion efficiency and overall operating efficiency of the furnace. In tests conducted on existing furnaces, the system of the present invention has demonstrated a capability to enhance furnace production capacity well beyond that for which the furnace was originally designed.

Thus, in accordance with features of the present invention, combustion and operational efficiency of a glass melting furnace are enhanced. Moreover, due to the fact that the addition to a glass melting furnace of oxygen lances in the manner described is a relatively low cost undertaking, coupled with the fact that introducing oxygen in the manner described achieves a considerable improvement in productivity in comparison with the cost of the oxygen that is consumed, it will be understood that the present invention is economical to implement and well worth the investment.

BRIEF DESCRIPTION OF THE DRAWING

The foregoing and other features, and a fuller understanding of the invention may be had by referring to the following detailed description and claims, taken in conjunction with the accompanying drawing, wherein:

DESCRIPTION OF THE PREFERRED EMBODIMENT

In accordance with the preferred practice of the present invention, oxygen is injected through lances at relatively high velocities at spaced furnace wall locations above but in close proximity to the top surface of molten glass in a furnace, and serves to draw the burner-generated flame down toward the surface of the molten glass to better impart the heat of the flame to the glass. Special thin-walled lances are provided for effecting oxygen injection, with the thin wall character of the lances rendering the lances adequately flexible to be bent as may be needed to enable the lances concurrently to directly discharge flows of oxygen most effectively to both draw the flame down toward the molten glass to improve the transfer of heat energy from the flame to the glass, and to provide the oxygen flow that is need to improve the character of the combustion activity itself. Radiation and convection shields provide radially extending flanges that are carried by the lances to cover the holes in the furnace walls that were drilled to install the lances. The shields prevent the escape of heat energy and the unwanted convection of gases through the drilled holes.

Figure 1:
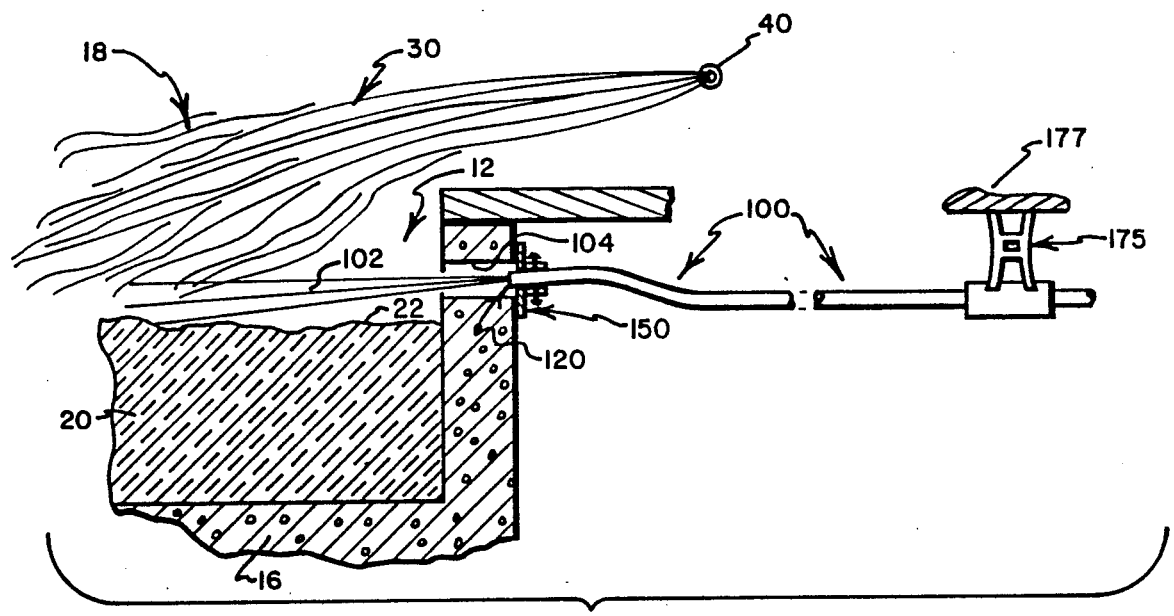
FIG. 1 is a foreshortened elevational view, which is a lateral section of a portion of a glass melting furnace showing the construction and mounting of a lance that embodies features of the preferred practice of the present invention; and, FIG. 2 is an elevational view, on an enlarged scale, of portions of the apparatus of FIG. 1, with the lance being foreshortened.

Referring to FIG. 1, portions of a conventional glass melting furnace are indicated generally by the numeral 10. The furnace 10 has a melting tank or basin 12 that is defined, in part, by a vertical wall 14 and a floor structure 16. A combustion zone 18 is provided atop the basin 12. A bath of molten glass 20 is contained in the basin 14, with the molten glass having a top surface 22.

While the materials that form a typical furnace are more complex in character than is the simplified structure that is shown in the drawings, it will be understood that features of furnace construction are well known and are of a conventional character which is outside the scope of the present invention.

Referring to FIG. 1, a blanket of flame 30 is formed as fuel from a spaced array of burners 40 is injected into the combustion zone 18. The flame blanket 30 tends to reside at a distance spaced above the top surface 22 of the molten bath 20.

It is quite common for the flame patterns that form various zones of the flame blanket 30 to vary in combustion efficiency, and in the efficiency with which heat energy is transferred to adjacent contents of the melting tank 12. The problems of combustion inefficiency and of improper flame pattern positioning is addressed by the present invention by providing a relatively simple and inexpensive system which may be utilized as needed to enhance combustion efficiency and to favorably modify flame pattern positioning and configurations.

In accordance with the preferred practice of the present invention, lances 100 (one such lance is shown in FIG. 1) which inject flows 102 of oxygen are provided so as to extend through holes 104 that are formed in the furnace walls 14. Typically, a hole 104 is drilled in a tuck stone portion of a furnace wall 14 at a location slightly above the top surface 22 of the molten glass 20 in the basin 12. A lances 100 is installed in the hole 104 and is aimed so that it will desirably alter the configuration and positioning of the flame patterns in the vicinities of the oxygen flow that it introduces, as by drawing the flames 30 downwardly toward the top surface 22, and by enriching the combustion with oxygen to assure complete combustion of fuel.

In testing various lance positioning as well as various oxygen discharge flow rates for use with each of the lances 100, the objectives that are kept in mind are quite straightforward. First, the supply of oxygen needs to be such that it will properly enhance combustion efficiency to give maximum heat energy from combustion of a given quantity of fuel. Second, the oxygen should be supplied at a lance exit velocity that is sufficient both to minimize dissipation of the oxygen as it travels to its desired location and to effect any desired degree of flame pattern modification. Still further, the direction of orientation of the lance should be such as to cause oxygen to flow along a path that is so directed as to effect a desired type of repositioning and/or alteration of the flame pattern, whereby flames are drawn down toward the top surface 22. Since a flame pattern tends to follow a path of an injected flow of oxygen, by aiming the flow path 102 across the top surface 22, the flame pattern 30 issuing can be directed downwardly toward contents of the melting tank 12.

Figure 2:
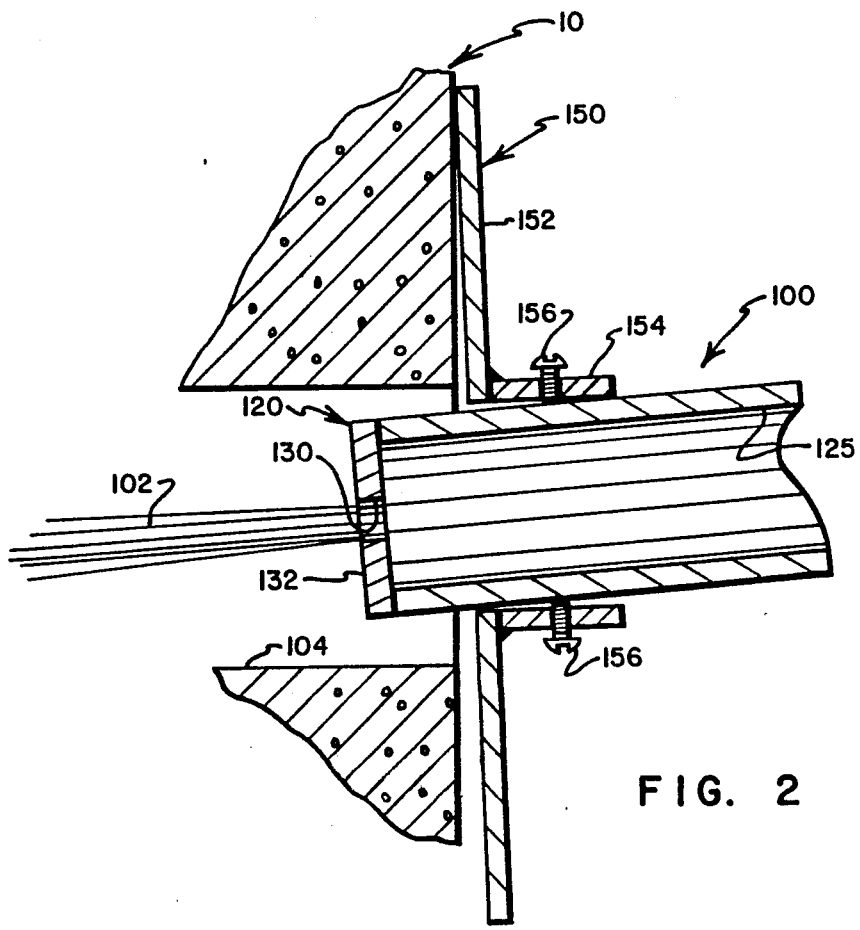

Referring to FIG. 2, the inner diameter 125 of the lance 100, and/or the diameter of its discharge opening 130, is selected through testing to provide an injected flow of oxygen that is suitable for each lance location. Typically, the lances 100 are installed at spaced intervals of a few feet along the length of a furnace wall 14.

The lance 100 is depicted in the drawing as comprising an elongate tubular member of thin wall construction which will be understood by those skilled in the art to be formed from stainless steel or other heat-resistant material. An end cap 132 preferably is welded over the discharge end 120 of the lance 100 to provide a discharge opening 132 that is smaller in diameter than the internal diameter 125 of the lance tube 100, whereby, if the opening 132 needs to be enlarged to provide increased flow, it can be drilled out as need be, and there will be no need to change to the use of a substitute lance. Typically, the lance 100 will have an internal diameter of about ⅜ inch to about ¾ inch. Typically, the discharge opening 132 will be of a size of about ¼ inch to about ⅜ inch. Typically, the rate of flow of oxygen discharged from any one lance during operation of the furnace 10 will be within the range of about 700 to about 2400 standard cubic feet per hour, with a relatively high discharge velocity typically exceeding about 200 feet per second.

A radially extending flange member 150 is movably carried on the lance 100. The flange member 150 is a welded stainless steel assembly of an annular member 152 formed from plate stock, and a tubular member 154 to which the annular member 152 is welded. One or more threaded fasteners 156 extends through the tubular member 154 and provides a means of clampingly installing the flange member 150 on the lance tube 100 at a location quite near the discharge end region of the lance 100.

A suitable conventional mounting bracket, indicated generally by the numeral 175 is provided for supporting the lance 100 from suitable existing structure 177 that typically forms part of the furnace 10, as those skilled in the art will understand.

The term "oxygen," as used herein, will be understood to include oxygen-rich gas of reasonable purity. The term "oxygen" is intended to include oxygen of commercial grades of purity (typically about ninety-nine percent pure) as well as oxygen which may have been produced by such economical processes as pressure swing absorption (typically about ninety percent purity). The term "oxygen" may also include other oxygen rich gas mixtures wherein oxygen is the predominant component (typically being of at least about seventy-five percent oxygen purity with the remainder of the mixture comprising substantially inert gases).

As will be apparent from the foregoing discussion, aspects of the present invention lie both is providing apparatus for implementing the described system, and in methods for operating it, both of which contribute in their respective ways to the enhancement of performance of a regenerative type fluid fossil-fuel fired furnace. While the invention has been described in conjunction with enhancing operation of a glass melting furnace, principles of the invention are equally applicable for use with other regenerative type furnaces wherein injection of relatively high velocity flows of oxygen through regenerators (or regenerator portions) toward burners positioned in association with regenerator-to-combustion-zone ports are found.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty existing the invention disclosed.

What is claimed is:

1. A method of treating glass in a glass melting furnace, comprising the steps of:
   (a) drilling a hole to provide a furnace wall opening in a wall of a glass melting furnace at a location above the level of molten glass that is within a basin of the furnace, and below the level of fuel discharge ports used to provide a blanket of flame atop the furnace basin to heat the molten glass;
   (b) providing a lance of thin walled tubular body construction that can be deformed with relative ease to correctively orient the direction of a discharge end region of the lance to inject a flow of oxygen from the lance through the furnace wall opening and into the combustion zone to accommodate particular localized conditions within the combustion zone of a glass furnace as by directing the flow of injected oxygen somewhat counter to such flows of gases within the combustion zone as tend to push the flow of injected oxygen off course;

(c) positioning and supporting the oxygen lance at a location outside the furnace wall and with only the discharge end region of the lance extending into the furnace wall opening;

(d) directing oxygen through the lance and through the furnace wall opening into a region of the combustion zone that closely overlies the top surface of the molten glass; and (e) adjusting the lance as is needed to maximize good performance by:
  (i) bending the thin walled tubular body of the lance at a location outside the furnace wall and spaced from the discharge end region of the lance to aim the discharge end region; and,
  (ii) positioning a radiation shield that is movably carried on the lance body to block unwanted gas flow and radiation heat loss thru the furnace will opening.

2. The method of claim 1 wherein the step of adjusting the lance includes the step of adjusting the rate of flow of oxygen that discharges from the discharge end region of the lance through the furnace wall opening and into the combustion zone by adjusting the size of a discharge opening that is provided in the discharge end region of the lance for discharging oxygen from the lance.

3. Apparatus for introducing a controlled flow of oxygen through a furnace well opening formed in a furnace wall and into a furnace combustion zone of a glass furnace beneath a fuel discharge part of the glass furnace comprising a lance having an elongate bendable tubular body with a tip end region for discharging a flow of oxygen into said combustion zone of a glass furnace, with the direction of flow of oxygen from the tip end region being readily changed by bending a portion of the tubular body of the lance at a location outside the furnace wall and spaced from the tip end region to inject the oxygen flow into the combustion zone to counteract conditions within the combustion zone tending to push the oxygen flow off course, thereby improving the glass furnace performance, and with the lance further including shield means that is movably adjustably positionable on the bendable tubular body of the lance at a location adjacent the furnace wall opening to substantially close the furnace wall opening, with the shield means serving to provide a radiation and convection shield limiting leakage through the furnace wall opening.

4. A glass melting furnace, comprising:
(a) structure defining a combustion zone atop a melting tank including combustion means for establishing a blanket of flame at a location atop the melting tank for melting glass and constituents thereof in the melting tank;

(b) injection means for injecting at least one relatively high velocity flow of oxygen through a furnace wall opening formed in a furnace wall which borders the combustion zone to supply a flow of oxygen that is projected across the top of the level of contents in the melting tank to draw flame downwardly from said location toward the top level of the contents; and, (c) the injection means including elongate lance means having a thin-walled tubular body and a discharge end region for injecting oxygen through the furnace wall opening and into the combustion zone so as to project across the top of the level of contents in the melting tank but beneath a blanket of flame that tends to reside at said location, with the thin walled tubular body being positioned outside the furnace wall and having a portion thereof that is bent out of coaxial alignment with other portions thereof so as to aim the discharge end region to inject oxygen through the furnace wall opening and into combustion zone along a path of flow that will serve the to draw flame downwardly from said location toward the top level of the contents.

5. The furnace of claim 4 additionally including positioning means for positioning and supporting the lance at a location outside the melting tank and spaced from the furnace wall opening to orient the flow path of oxygen that is injected from the discharge end region of the lance through the furnace wall opening and across the top level of the contents.

6. A method for improving the efficiency of operation of a glass melting furnace that has a melting tank and a combustion zone located generally atop the melting tank, and having combustion means for burning fuel to provide a blanket of flame atop a melting tank, comprising the steps of:
(a) providing a lance means having an elongate tubular body with a discharge and region thereof extending into a furnace wall opening formed through a wall of the furnace that borders the combustion zone, with the discharge end region of the tubular body of the lance means extending into the furnace wall opening in communication with the combustion zone;

(b) injecting a flow of oxygen through the discharge end region of the lance means and through the opening in the furnace wall along a substantially linear flow path across the top surface of molten glass in the melting tank of the furnace at a velocity sufficient to minimize dissipation of the injected flow of oxygen and to draw flames from the blanket of flame toward a selected portion of the combustion zone that immediately overlies the top surface of the molten glass;

(c) providing positioning means at a location spaced from a furnace wall opening for positioning and supporting the lance means to orient said substantially linear flow path of the flow of oxygen that is injected from the lance means; and (d) adjusting the lance means by deforming the body portion of the lance means between the positioning means and the furnace wall opening to orient the discharge end region of the lance means in a direction to cause the flow of injected oxygen emanating therefrom to beneficially alter the configuration of the flame pattern within the furnace and thereby enhance the efficiency with which these flames transfer heat energy to the melting tank contents.

* * * * *